July 16, 1957  P. B. CARLSON  2,799,410
OVERSHOT SHOVEL LOADER
Filed May 1, 1953  3 Sheets-Sheet 1

INVENTOR.
PAUL B. CARLSON
BY WHITEHEAD & VOGL
PER
ATTORNEYS

July 16, 1957 P. B. CARLSON 2,799,410
OVERSHOT SHOVEL LOADER
Filed May 1, 1953 3 Sheets-Sheet 2

INVENTOR.
PAUL B. CARLSON
BY WHITEHEAD & VOGL
PER *Carl Whitehead*
ATTORNEYS

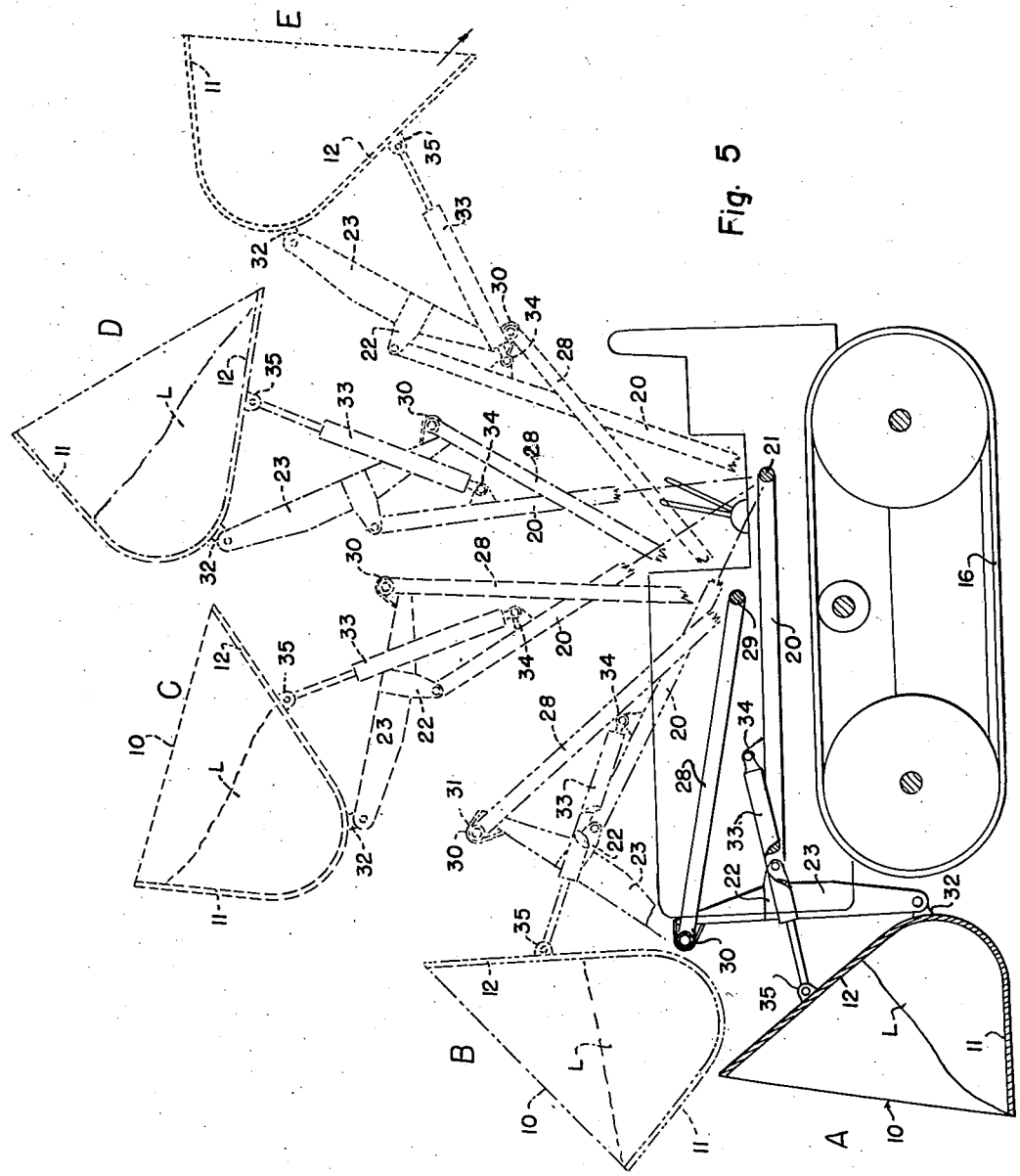

United States Patent Office 2,799,410
Patented July 16, 1957

2,799,410

OVERSHOT SHOVEL LOADER

Paul B. Carlson, Byers, Colo.

Application May 1, 1953, Serial No. 352,449

4 Claims. (Cl. 214—140)

This invention relates to tractor-mounted loading shovels, and more particularly to that class of shovels which are adapted to be positioned at the forward end of a tractor for loading and to be swung over the body of the tractor to the rear end thereof for dumping. Such shovels are commonly called "over-shot loading shovels" and hereinafter will be so referred to.

The primary object of this invention is to provide an improved and simplified arrangement of carrier arms for mounting an overshot loading shovel upon a tractor, while other objects of this invention are to provide, in such an improved carrier arm assembly: (1) an arrangement of elements which compactly and rigidly hold the shovel closely against the front of the tractor for loading by forward movement of the tractor, yet which provides operative clearances to freely lift and extend the shovel over the tractor without any danger of striking the tractor body or the operator thereof: (2) an arrangement which may be easily mounted upon any conventional type of tractor, whether an endless-thread track type or wheel type: (3) a linkage of arm members which is always above and clear of the endless-thread track or the front wheels of the tractor: (4) a linkage of arm members adapted to extend itself so as to place the shovel over and above the tractor at an extremely high reach for dumping material in high-walled truck bodies or the like; (5) a linkage of arm members adapted to extend itself so as to provide an extensive rearward overreach of the shovel beyond the rear end of the tractor to facilitate dumping loads in the middle portion of an adjacent truck or the like; (6) an optional accessory abutment means which reinforces the carrier arm assembly when the shovel is positioned for loading at the front end and thereby permits a scooping or bulldozing action of the tractor with a light-weight construction of a shovel carrier arm assembly; and, (7) a simple, economical, and easily-controlled apparatus, ruggedly and durably designed for extensive and repeated use.

With the foregoing and other objects in view, all of which more fully hereinafter appear, my invention comprises certain novel combinations and constructions of elements and parts as hereinafter described, and as defined in the appended claims, and illustrated, in preferred embodiment, in the accompanying drawing in which:

Figure 1 is a side-elevation view of a typical endless treads-track-type tractor having my improved carrier arm assembly mounted thereon to carry a shovel, the shovel being shown in the forward loading position with broken lines indicating a downwardly turned position of the shovel for scoop loading by a forward movement of the tractor and with other broken lines indicating an optional accessory reinforcing member which may be attached to the tractor to resist the pressure against the shovel during such forward-scooping movement.

Figure 5 is a section similar to Fig. 4 but diagrammatic in nature showing an outline of the tractor and selected actuating elements of the carrier arm assembly at various operative positions for one selected type of operation, all to better illustrate the operative principles of the invention.

Although many types of carrier arms have been devised for tractors to carry a shovel and to lift it upwardly to selected dumping positions for loading on trucks or like uses, and even to move the shovel over the tractor to provide an overshot loading shovel, there have been several distinct disadvantages which render conventional units unsuitable for some operations which such apparatus should be able to perform. A problem has been to devise a simple carrier-arm linkage for an overshot loading shovel, which is no wider than the tractor, which is compactly positioned and is adapted to carry the shovel in front of the tractor, yet which may lift the shovel over the tractor and extend itself to provide a large overhead clearance, a high dumping position and a substantial rearward overreach beyond the rear end of the tractor. My improved carrier arm contemplates a linkage which is always above the endless-treads tracks (or front wheels) and a shovel which is no wider than the tractor itself. In essence, my improved construction comprises a linkage having a lifting arm which is pivotally connected to the body of a tractor above the endless-treads (or wheels) and is adapted to extend forwardly to connect with leg members which depend from the arm and carry the shovel in front of the endless-treads tracks, and an auxiliary arm pivotally connected to the tractor forwardly of and above the lifting arm to connect with said leg members above the lifting arm. This auxiliary arm serves to rotate the leg members to extend the shovel as the lifting arm moves over the tractor, all as hereinafter described in detail.

Figure 3:
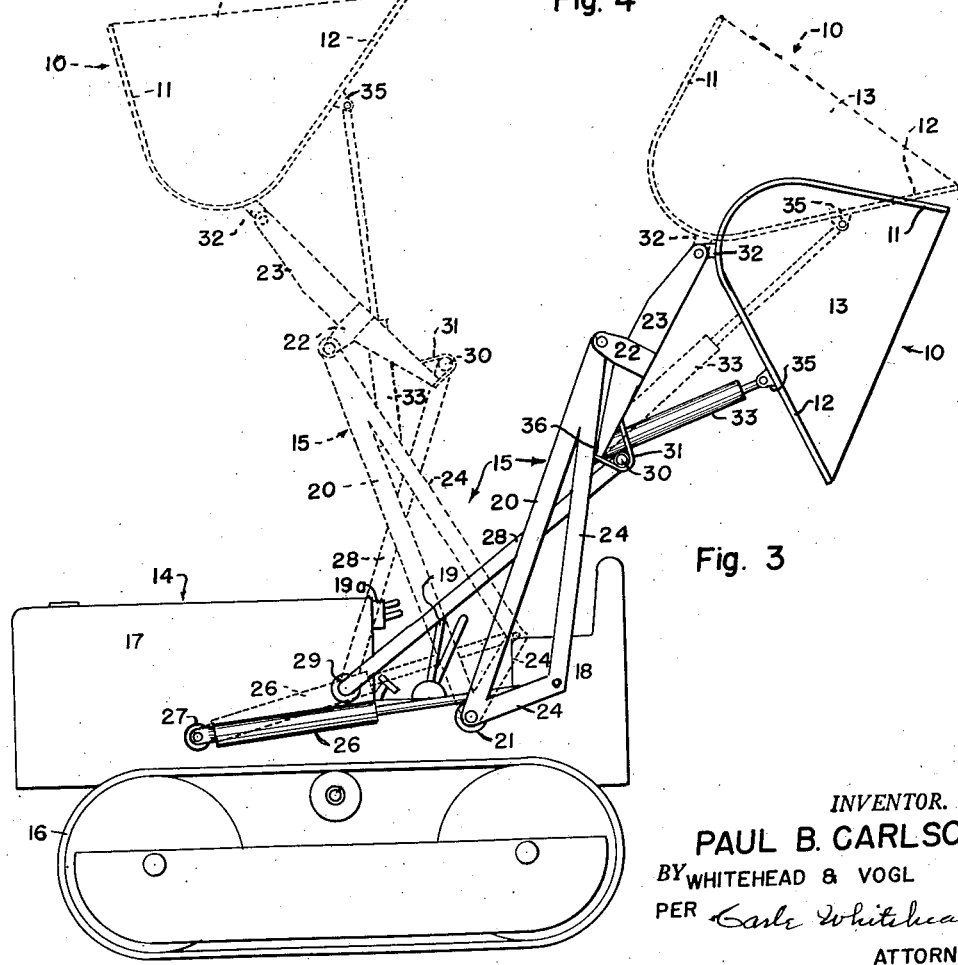
Figure 3 is a side elevation of the tractor similar to Fig. 1 but illustrating the shovel lifted over the tractor to the dumping position and with broken lines indicating intermediate positions of the shovel and carrier arm assembly during the movement over the tractor.

Referring to the drawing, the shovel 10 is formed as a conventional U or V-shaped trough-like bucket having a bottom surface 11 and a backing surface 12 joined together by a rounded apex and being end-closed as by side walls 13. The bottom surface may be lowered to scoop a load of material into the shovel as indicated by broken lines at Fig. 1, and then the shovel may be inclined upwardly to hold the material as illustrated. When such a shovel 10 is tilted upright as shown by the broken-line position at Fig. 3, a considerable amount of material may be held therein.

This bucket is mounted upon a tractor 14 and aligned therewith by my improved carrier arm assembly generally indicated at 15, and is only slightly wider than the widest part of the tractor 14. The tractor 14 may be of any conventional style and is shown as being mounted upon an endless tread track 16, but it may also be mounted upon front and rear wheels, not herein shown, in conventional manner and hereinafter, and in the appended claims, it will be understood that the term "endless tread" and "wheels" will be used synonymously. The chassis of the tractor, above the track 16, includes the motor section 17 at the forward end and an operator's section 18 at the rear end thereof with suitable operative controls 19 in the operator's section, such controls including levers 19a, or the like, to operate plungers associated with the linkage, as hereinafter described.

The carrier arm assembly 15 is formed as two groups of symmetrically opposed members, each group being mounted at one side of the tractor-14 chassis upon suitable pivot bosses which extend from the sides of the tractor as hereinafter described. Only one group of such members will be described in detail since the corresponding members of the opposing group are similar in construction. To facilitate the description of the elements of carrier arm 15, it will be first described in its lowered position as at Fig. 1.

Each group of carrier-arm-15 elements includes a lifting arm 20 which is horizontally disposed above the tread 16 when the shovel is lowered. The rear end of this arm 20 is pivotally connected to the tractor upon a boss 21 which extends transversely outwardly from the tractor chassis below the operator's section 18 at the rear end thereof. From this connection the arm 20 extends forwardly and the front end is pivotally connected to a short strap 22 which outstands rearwardly from the center of an upstanding leg 23 at the forward end of the tractor the leg being thereby pivotally carried by the arm 20. This leg 23 depends from the arm 20 in front of the track 16 with its bottom end attached to the shovel 10, and extends above the arm 20 for attachment to members hereinafter described.

The carrier arm 20 is reinforced by an angular strut 24 which upstands from the upper edge of the carrier arm so that the strut 24 and carrier arm 20 form a rigid triangular frame.

A boss 25 outstands from the apex of the strut 24 and provides a pivotal connection for the plunger rod of an hydraulic piston 26. The body of this piston 26 is pivotally mounted upon another boss 27 which outstands from the tractor chassis near its forward end at such a position that the extension of the plunger rod of the piston 26 causes an upward rotation of the forward end of lifting arm 20 above and over the tractor.

A horizontally disposed auxiliary arm 28 is carried above lifting arm 20, and is pivotally connected to a boss 29 which transversely outstands from the body of the tractor at a point forwardly and above the lifting arm connective boss 21. This auxiliary arm 28 extends forwardly from boss 29, and its forward end is connected to a transverse head shaft 30 at the top of the upstanding leg 23.

In addition to being connected to the forward end of each auxiliary arm 28, the transverse head-shaft 30 extends across the tractor, and each end is connected to the top of a leg 23 by a bearing strap 31, and thereby the head-shaft 30 forms a transverse interconnecting link between the two carrier arm units 15 at each side of the tractor.

The shovel 10 forms the other transverse interconnection between the two sets of carrier arm units 15, the shovel being pivotally attached to the bottom of each leg 23 by a pair of ears 32 which outstand from the back side of the shovel at the curved section between the bottom 11 and backing surface 12. This pivotal connection permits rotation of the shovel 10 about the axis of the pivot at the bottom of the legs 23 to permit it to be lowered to the scooping position, and then to be raised to a holding position during its movement over the top of the tractor, and finally to be tilted to a dumping position as clearly shown by the full and broken-line positions at Figs. 1 and 3.

This rotation of the shovel 10 is controlled by an hydraulic piston 33 on each carrier arm unit 15. The cylinder end of each piston 33 is pivotally connected to an outstanding boss 34 on a carrier arm 20 and the plunger end is pivotally connected to a pair of ears 35 which outstand from the backing face 12 of the bucket. It follows that an operator may extend or retract this plunger as by manipulation of controls 19a to hold the shovel at any suitable position during its movement over the tractor.

The relative location of the pivotal connections of the lifting arm 20 and auxiliary arm 28 to the tractor and to the leg 23 is such that the two arms lie substantially horizontal when the shovel is lowered to loading position in front of the tractor. This linkage thus provides, first, a direct non-rotative upward movement of the leg 23 which permits the head-shaft 30 and the shovel 10 to clear the front end of the tractor. However, as the shovel is lifted above the front end of the tractor, the lift arm 20 crosses over the auxiliary arm 28 to rotate and extend upwardly the lower end of the legs 23. It follows that the shovel 10 must also be rotated by extending the piston 33 to keep the loaded position, shown by the broken lines at Fig. 3.

This upward and outward extension of the legs 23 continues by the crossing of the carrier arm with respect to the auxiliary arm to completely rotate the legs 23 about the forward end of carrier arm 20 until the stop 36 at the top end of the legs 23 contacts the top edge of the strut 24. The lift arm is then at its extreme rearward position as clearly indicated at Fig. 3. At such position the legs 23 are substantially in line with the carrier arms 20 and their lower ends, which carry the shovel, are sufficiently extended to provide a maximum rearward overreach of the shovel which is advantageous for the loading of trucks unable to move close to the tractor or wide-bodied trucks where such an overreach is necessary. The extent of this overreach is regulated by the length of the strap member 22 on legs 23.

Figure 1:
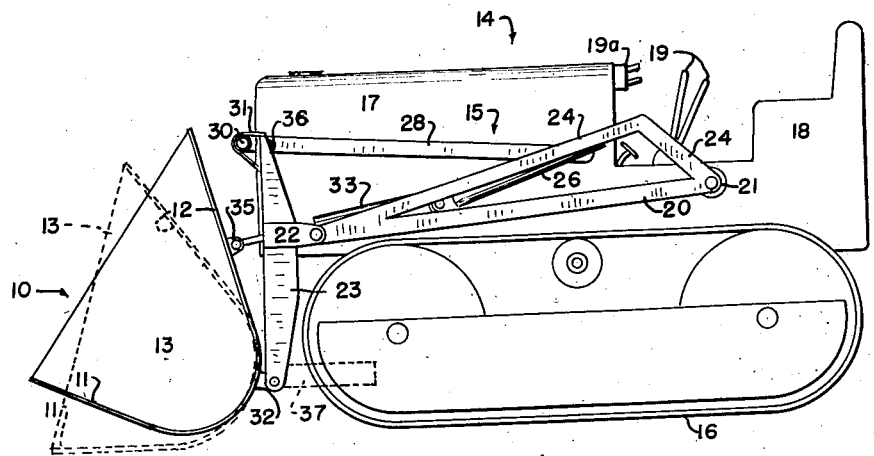
Figure 2:
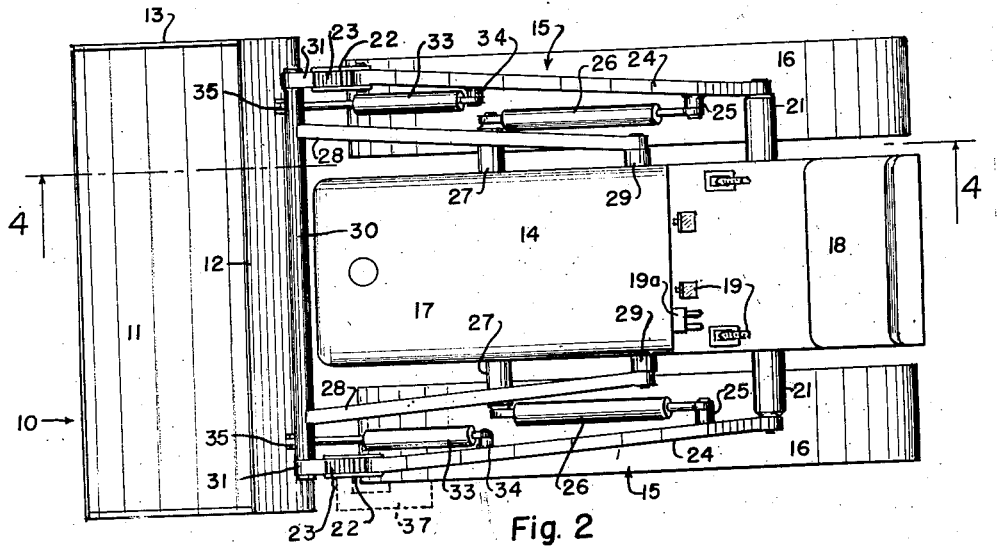
Figure 2 is a plan view of the construction illustrated at Fig. 1.
Figure 4:
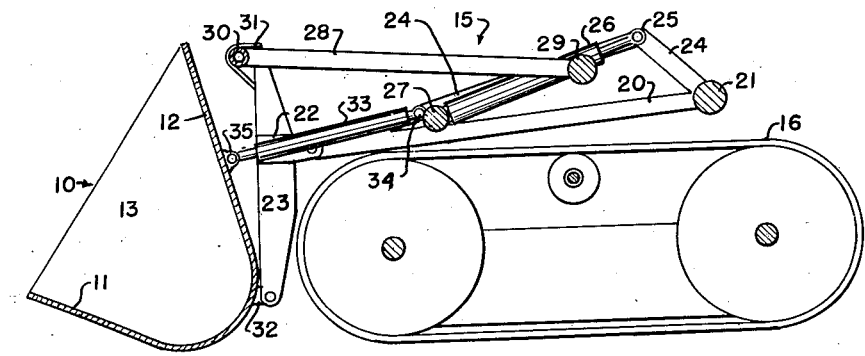
Figure 4 is a section as viewed from the indicated line 4—4 at Fig. 2 to better illustrate the actuating elements of the carrier arm assembly.

As viewed at Fig. 1, the connection of the carrier arm 20 with its leg 23 forms a T-shaped unit when the arm is in the lower position with the shovel in front of the tractor, and this T-shaped unit permits the linkage to be above and clear of the tractor track. However, such overhanging construction may not be desirable where the unit is used for bulldozing operations and considerable pressure will be exerted against the bottom of the legs 23. Therefore, an auxiliary abutment bar 37 may be mounted upon the tractor in such a manner that it extends forwardly of the track to abut against the lower end of the arm 23, opposite the pivotal connection at 32, as indicated by the broken lines at Figs. 1 and 2. With such an abutment it is possible to design the lifting arms as lightweight members having only the necessary strength to lift the load over the tractor and yet obtain a unit strong enough to perform actual bulldozing operations.

An outstanding advantage of the invention lies in the simplicity of performing ordinary overshot loading operations, in that the piston 33 may be set at a selected position to operate as a fixed link and thereby the only controls necessary to operate the overshot shovel are those which actuate the pistons 26 to raise the lifting arms 20. It is unnecessary for an operator to coordinate the actuation of the piston 33 with the actuation of the piston 26 in such operations. In fact it is within the contemplation of the invention that when the piston 33 is set at such selected position it serves as a rigid link.

Figure 5 illustrates an operation of the shovel with the piston 33 in a fixed position in accordance with such contemplation. Figure 5 is a diagrammatic representation of the elements of the carrier arm assembly at various positions A, B, C, D, and E which show the position of the shovel during its movement over the tractor and the shifting of a load L within the shovel during such movement. For sake of simplicity the lifting arm 20 is shown as a simple arm without the strut 24, piston 26 and bosses 25 and 27 hereinbefore described, and it is to be understood that the rotation of the lifting arm 20 is effected by such elements not shown. The piston 33 is affixed to the lifting arm as by the boss 34 as hereinbefore described and referring to the initial position A, the piston 33 is extended to drop the bottom 11 of the shovel to a horizontal scooping position while the arm 20 is raised a small amount to set the bottom 11 to any selected elevation with respect to the tracks 16 of the tractor. A forward movement of the tractor will permit the shovel to move into an embankment or the like and get a load L in a conventional manner.

Once loaded, the piston 33 is not disturbed but permitted to remain in its extended position to function as a rigid link. Next, the arm 20 rotates upwardly about its pivot at the boss 21 to commence the lifting movement and overshot operation. The shorter auxiliary arm 28 pulls the top of the leg 23 to swing the bucket 10 outwardly and at the same time the piston 33 acts as a link to tip the bucket upwardly as to position B. The bucket clears the front of the tractor by this movement and rotates to better hold the load L.

As the rotation of the lifting arm 20 continues, the auxiliary arm pulls the top of the leg 23 into and against the lifting arm and towards a position where the leg is in alignment with the lifting arm 20. At the same time the fixed piston 33 pushes the top of the bucket backing surface 12 upwardly to prevent the load L from dropping on the operator. This movement of the bottom of the leg 23 into substantial alignment with the lifting arm 20 places the bucket a considerable distance above the reach of the lifting arm 20 since the bucket is attached at the bottom of the leg as at 32.

The final limiting movement of the lifting arm 20 moves the bucket 10 considerably behind the tractor while the auxiliary arm pulls the leg 23 against the lifting arm and with the bucket surface 12 sloped to a dumping position as clearly illustrated at position E.

While I have described many details and constructions of my invention, alternative and equivalent arrangements, which are within the spirit and scope of my invention, will occur to those skilled in the art. Hence, I desire that my protection be limited only by the proper scope of the appended claims.

I claim:

1. In combination with a tractor having a body section with an endless tread track outstanding from each side thereof, an overshot loading assembly, including a lifting arm at each side of the tractor pivotally attached to the body near the tractor rear end above and within the outer edge of the track and adapted to normally extend forwardly to the front end of the tractor in a substantially horizontal position above the track, a leg pivotally connected to the forward end of each lifting arm at a point near the center of the leg, one end of each leg being adapted to normally depend from said arm end in front of the track, the other leg end being adapted to upstand from said arm end, a shovel attached to the bottom of said depending leg ends and normally in loading position in front of the track base, means for rotating the lifting arms from their normal substantially horizontal position to a position above and rearwardly of the tractor, an auxiliary arm at each side of the body having one of its ends pivotally attached to the body forwardly of and above the lifting-arm-pivotal-connection and its other end pivotally attached to the upstanding leg end, whereby said auxiliary arm lies substantially parallel with the lifting arm when the lifting arm is in shovel-loading position and is thereby adapted to hold the legs in a substantially vertical position during the first part of the rotational movement of the lifting arm and thence to rotate and extend the normally depending end of the legs to a position substantially in alignment with the lifting arms and to thus maintain said legs during the balance of the rotational movement of the lifting arms and link means attached to the shovel and to the lifting arm adapted to rotate the shovel about its connection at the bottom of said depending leg ends, whereby to hold the shovel in a load retaining position while the assembly moves over the tractor.

2. An overshot lifting arm assembly for tractors and the like adapted to carry a shovel or the like including in combination, a lifting arm pivotally attached to the tractor near the tractor rear end above the wheels thereof and normally extending forwardly to the front end of the tractor above the wheels; means for rotating said lifting arm about its pivotal attachment upwardly and over the tractor; a leg pivotally connected to the extended end of the lifting arm at a point near the center of the leg with one end thereof normally depending from the end of the lifting arm in front of the tractor wheels and the other end thereof normally upstanding from the end of the lifting arm; an auxiliary arm shorter than the lifting arm and having one end pivotally attached to the tractor forwardly of the lifting-arm pivotal connection and having the other end pivotally attached to said upstanding leg end, said auxiliary-arm pivotal connection being positioned to coordination with the lifting-arm pivotal connection whereby to hold said leg in a substantially vertical position when the lifting arm is in said normal forwardly extending position and to rotate the leg about its connection at the lifting arm to a position in substantial alignment with the lifting arm and with the normally depending end of the leg extending outwardly and upwardly beyond the end of the lifting arm as the lifting arm rotates upwardly and over the tractor; and means for attaching a shovel or the like to the bottom of said depending leg end.

3. An overshot operative lifting-arm-assembly for a tractor-carried trough-shaped overshot loading shovel having a bottom surface whereon a load is placed with the lifting arm assembly in a normal position and the shovel at the forward end of the tractor and a backing surface wherefrom a load is discharged when the shovel is shot over the tractor and including, in combination; a lifting arm pivotally attached to the tractor near the tractor rear end and normally extending forwardly to the forward end of the tractor substantially above the base of the shovel; means for rotating said lifting arm about its pivotal attachment upwardly and over the tractor; a leg pivotally connected to the extended end of the lifting arm at a point near the center of the leg with one end thereof normally depending from the end of the lifting arm to the base of the shovel, the bottom end of said leg being pivotally connected to the base of the shovel, and with the other end of the leg normally upstanding from the end of the lifting arm; an auxiliary arm shorter than the lifting arm and having one end pivotally attached to the tractor forwardly of the lifting-arm pivotal connection and having the other end pivotally attached to said upstanding leg portion, said auxiliary-arm pivotal connection being coordinated with the lifting-arm pivotal connection whereby to hold said leg in a substantially vertical position with the lifting arm in its normal, forwardly extending position and to rotate the leg about its connection at the lifting arm to a position in substantial alignment with the lifting arm as the lifting arm rotates upwardly and over the tractor, whereby the normally depending end of the leg extends outwardly and upwardly beyond the end of the lifting arm and link means between the lifting arm and backing surface of the shovel adapted to rotate the shovel about its connection at the bottom of the leg to push the backing surface away from the leg as the leg moves into alignment with the arm whereby to prevent a load on the backing surface from sliding out of the shovel until the shovel overshoots the tractor.

4. An operative assembly for a tractor-carried trough-shaped overshot loading shovel having a bottom surface and a backing surface, adapted to carry the shovel in a normal lowered loading position at the forward end of the tractor and to lift the shovel over the tractor and rearwardly to a dumping position beyond the rear end of the tractor, including, in combination, a lifting arm pivotally attached to the tractor near the tractor rear and above the wheels thereof and normally extending forwardly to the front end of the tractor above the wheels and above the base of the shovel, a leg pivotally connected to the extended end of the lifting arm and adapted to normally depend therefrom with the shovel base being connected to the lower end of the leg, an extension of said leg adapted to normally upstand from the extended end of the lifting arm, an auxiliary arm shorter than the lifting arm and having one end pivotally attached to the tractor forwardly of and above said pivotal connection of the lifting arm and the other end pivotally attached to the upstanding leg extension whereby to normally lie substantially parallel with the lifting arm and to normally hold the leg in a substantially vertical position when the arm is in shovel loading position, means for rotating the lifting arm above said pivotal attachment upwardly and over the tractor, said auxiliary arm being thereby adapted to pull the leg into substantial alignment with the lifting arm during the latter part of the rotation of the arm to shovel dumping position.

References Cited in the file of this patent

UNITED STATES PATENTS

| | | |
|---|---|---|
| 1,742,494 | Clausen | Jan. 7, 1930 |
| 2,438,660 | Garner | Mar. 30, 1948 |
| 2,446,938 | Losch | Aug. 10, 1948 |
| 2,455,474 | Drott et al. | Dec. 7, 1948 |
| 2,490,724 | Williams | Dec. 6, 1949 |
| 2,660,816 | Maxwell | Dec. 1, 1953 |
| 2,684,163 | Boulton | July 20, 1954 |
| 2,707,056 | Gerst | Apr. 26, 1955 |

FOREIGN PATENTS

| | | |
|---|---|---|
| 458,913 | Canada | Aug. 16, 1949 |